Feb. 12, 1935.  W. A. RIDDELL  1,991,119
PHOTOGRAPHIC TIMING APPARATUS
Filed April 5, 1932
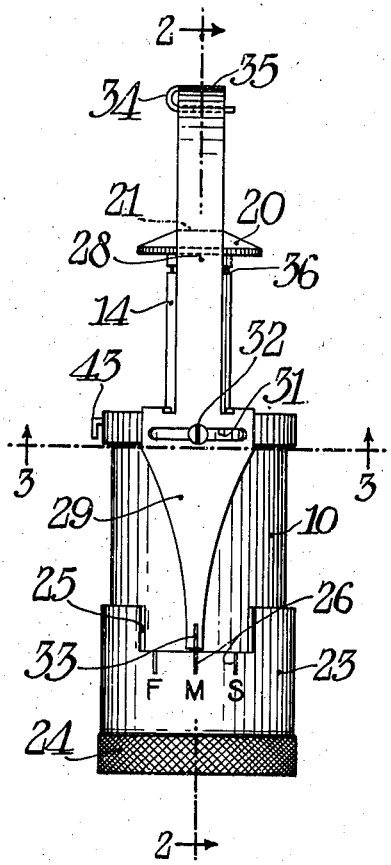
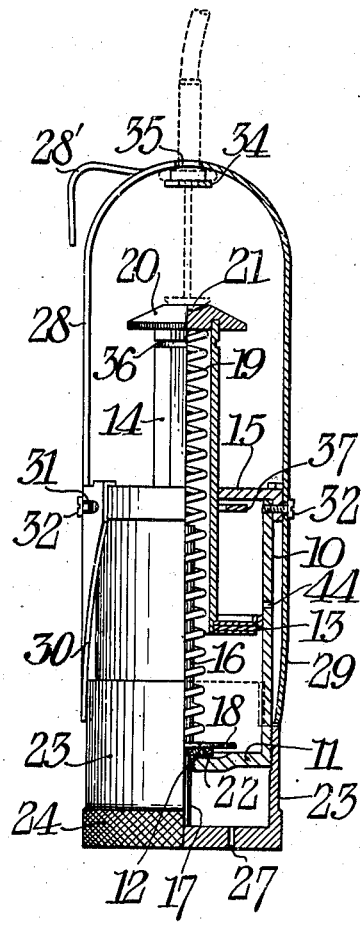
William A. Riddell,
Inventor:
Newton Perrins
By George A. Gillette, Jr.
Attorneys Patented Feb. 12, 1935

1,991,119

UNITED STATES PATENT OFFICE 1,991,119

PHOTOGRAPHIC TIMING APPARATUS

William A. Riddell, Rochester, N. Y., assignor to Eastman Kodak Company, Rochester, N. Y., a corporation of New York Application April 5, 1932, Serial No. 603,313

9 Claims. (Cl. 161—26)

The present invention relates to a photographic timing apparatus and more particularly to a pneumatic type of self-timer for actuating the cable release of a photographic shutter.

Many types of timing devices for actuating the cable release of a photographic shutter are already known. The outstanding advantage of these timing devices is that the shutter of the camera is operated only after a predetermined interval and the operator has an opportunity to enter the photographic field of the camera before the shutter is operated. It has also been proposed to construct timing devices so that the predetermined time interval may be varied, thus giving the operator more or less time, as desired, to enter the photographic field or to perform any other acts before the shutter is operated.

The timing apparatus of the present invention is quite similar in appearance and function to the shutter actuating device disclosed in the patent to Paul J. Marks, No. 1,255,901, issued February 12, 1918. However, the timing apparatus of the present invention presents many improvements and refinements in the manner of constructing and assembling such a shutter actuating device.

The primary object of the present invention is the provision of an adjustable timing apparatus having a cylinder provided with a port in the bottom thereof for the admission of a fluid, and having a control means for regulating the admission of fluid into the cylinder which includes a washer located within the cylinder and adapted to assume a predetermined position with respect to the bottom of the cylinder.

Another object of the present invention is the provision of a timing apparatus which has an adjustable cap threaded onto a pneumatic cylinder for varying or controlling the admission of air into the cylinder, said cap cooperating with a pointer to indicate the setting of the timing apparatus.

A still further object of the present invention is the provision of a timing apparatus which comprises a pneumatic cylinder, a cap adjustably mounted thereon and a yoke adapted to support a cable release and including a pair of pointers, one of which cooperates with the cap to indicate the setting of the timing device and the other of which acts as a friction drag on the exterior of the cap.

Still another object of the present invention is the provision of a timing device comprising a pneumatic cylinder, a cap adjustably mounted thereon and a yoke adjustably mounted upon the pneumatic cylinder so that the position of a pointer on the yoke may be varied to alter the absolute value of the time settings.

The photographic timing apparatus of the invention comprises a pneumatic cylinder provided with a port in the bottom thereof, a cap threaded onto said cylinder and a control means for varying the admission of fluid into the cylinder, said control means including a washer located within the cylinder and adapted to be variably spaced with respect to the cylinder bottom by adjustment of the cap. A yoke is adjustably mounted upon the cylinder, is adapted to support a cable release for actuation by a plunger operated by the piston of the cylinder and includes a pair of pointers, one of which cooperates with the cap to indicate the setting of the timing apparatus and the other of which functions as a drag or brake upon the cap.

Reference is hereby made to the accompanying drawing in which similar elements are designated by similar reference numerals and in which:

Fig. 1 is a front elevation of the timing apparatus according to the invention.

Fig. 2 is a semi-elevation of the side and a semi-cross section of the photographic timing apparatus according to the invention, the cross-sectional portion of Fig. 2 being taken on the line 2—2 of Fig. 1.

Fig. 3 is a horizontal cross-section of the timing apparatus taken on the line 3—3 of Fig. 1.

In the illustrated embodiment of the invention, the cylinder 10 has a dished bottom 11 provided with an axially located port 12. A piston 13 of any well-known construction is adapted to slide within cylinder 10 and is attached to a hollow plunger 14 which extends through the cover 15 of the cylinder 10. A rod 16 is axially located within cylinder 10 and has a restricted portion 17 which extends through port 12 in spaced relation to the sides thereof. A disk 18 is mounted on the restricted portion 17 of rod 16. A coil spring 19 encircles rod 16 within cylinder 10 and extends into the hollow plunger 14. Coil spring 19 is maintained within the cylinder between the top 20 of plunger 14 and the disk 18 on the restricted portion 17 of rod 16. Top 20 is provided with a concave depression 21.

A washer 22, preferably circular and composed of leather, is mounted upon restricted portion 17 of rod 16 and is adapted to cover the port 12 in cylinder 10. A cap 23 has a knurled rim 24, and is threaded onto cylinder 10 as best illustrated at the right side of Fig. 2. Cap 23 is provided with a recessed portion 25 and a plurality of graduations 26 spaced along the lower edge of the recess. A hole 27 is provided in the bottom of cap 23 for the admission of air which is in turn admitted into cylinder 10 through port 12.

The coil spring 19 normally moves or tends to move the piston 13 to the position of maximum displacement, in other words, piston 13 is normally moved by coil spring 19 to draw fluid into cylinder 10. Coil spring 19 also urges the restricted portion 17 of rod 16 into abutment with the bottom of cap 23. The axial location of cap 23 upon cylinder 10 determines the axial position of rod 16 and its restricted portion 17. The axial location of cap 23 also determines the position of washer 22 with respect to bottom 11 of cylinder 10. If the time interval for maximum displacement of piston 13 is to be relatively long, the cap 23 should be axially located so that coil spring 19 presses washer 18 into position very close to cylinder bottom 11 and so that the passage for the admission of fluid into the cylinder is considerably restricted. On the other hand, if the time interval for maximum displacement of the piston 13 is to be relatively short, then cap 23 should be screwed farther onto cylinder 10 so that there is a greater space between washer 22 and cylinder bottom 11 and so that fluid is more readily admitted into cylinder 10.

One of the outstanding features of the present invention is the location of washer 22 within cylinder 10. Such location of the washer obviously protects it from contamination by grease or dirt and also assures more uniform control of the rate at which fluid enters the cylinder. It will be noted that the fluid rushing into the cylinder 10 will exert a force on washer 22 which moves it away from cylinder bottom 11, thus there is no possibility of washer 22 becoming stuck to the bottom 11 of cylinder 10 or becoming jammed to restrict the spacing between washer 22 and bottom 11 more than is desired or more than the setting of the cap 23 would normally permit. This interior location of washer 22 is quite distinct from the fluid admission controls exhibited by the prior art which uniformly locate the washer or other restricting means so that it is drawn against the cylinder wall by the inrushing fluid.

A yoke 28 is of inverted U-shaped formation and includes a pointer 29 integral with one extremity thereof and a pointer 30 integral with the other extremity thereof. The yoke 28 has a hook 28' for attachment to the camera bed and is provided in each leg with a horizontal slot 31. Diametrically opposite bolts 32 pass through the slots 31 in each leg of yoke 28, through the edges of cap 15 and are threaded into the cylinder 10. The pointer 29 extends downwardly along the side of cylinder 10 into the recessed portion 25 of cap 23. Pointer 29 is provided with an index mark 33 for registering with the graduations 26 on cap 23 and for indicating the setting of cap 23.

The pointer 29 also acts as a stop for cap 23 so that it cannot be accidentally or casually unscrewed from cylinder 10. This last mentioned feature is of importance inasmuch as when the yoke 28 has been attached in position on cylinder 10 with cap 23 threaded into the desired position, the cap 23 cannot be easily removed from cylinder 10 nor can the absolute range of time intervals of the apparatus be easily varied. However, if the maximum or minimum setting of the timing apparatus is not suitable to existing conditions, the range of timing settings may be varied as a whole by springing out pointer 29 and turning cap 23 in the desired direction until pointer 30 springs into recessed position 25, whereupon pointer 30 will now function in the same manner as previously described with respect to pointer 29.

The yoke 28 has an integral spring clip 34 and is provided with a notch 35. Clip 34 and notch 35 form a mounting for one end of a cable release as indicated by dotted lines in Fig. 2. The plunger of the cable release extends downwardly and fits into the concave depression 21 in the top 20 of hollow plunger 14.

The hollow plunger 14 is provided with a groove 36. A plate 37, see Fig. 3, is provided with a circular aperture 38 which has a flat portion 39 adapted to engage the groove 36 in plunger 14. Plate 37 is mounted upon cylinder cover 15 by a pin 40 which slides in a slot 41 provided in plate 37. A spring arm 42 on plate 37 normally presses the flat portion 39 against plunger 14 and into groove 36 when the plunger 14 is moved downwardly to bring the groove 36 below cover 15. As a result plunger 14 will be held in the position of minimum displacement by plate 37 in spite of the tendency of coil spring 19 to raise said plunger 14. The flat portion 39 of plate 37 is disengaged from groove 36 by a release 43 integral with plate 37 and extending to the exterior of the apparatus through the cylinder 10 and the edge of cover 15.

The side wall of cylinder 10 is provided with a hole 44 so that the last part of the upward stroke of piston 13, plunger 14 and top 20 will take place rapidly and so that the plunger of the cable release will be moved rapidly through its critical position. The initial upward movement of piston 13 and plunger 14 under the action of coil spring 19 will be retarded corresponding to the spacing between washer 22 and the bottom 11 of cylinder 10. After the piston has moved above hole 44 the restraint on coil spring 19 is substantially all removed and plunger 14 will be moved rapidly upward.

The operation of the photographic timing device will now be described:

The plunger 14 and top 20 are manually depressed so that plate 37 engages groove 36 and plunger 14 is held in its lowermost position. The cable release may be positioned between clip 34 and notch 35 and the various adjustments on the shutter can be made. The cap 23 is adjusted to F, M or S position depending upon whether fast, medium or slow action of the plunger is desired. Release 43 is pressed and coil spring 19 acts to move piston 13 upwardly but this upward movement is retarded by the restriction on fluid admission, that is, by the spacing between washer 22 and the bottom 11 of cylinder 10. During this interval the operator has an opportunity to enter the photographic or camera field.

After piston 13 has passed hole 44 the movement of plunger 14 is more rapid and the plunger of the cable release is quickly moved through its trip position.

If the setting S of cap 23 does not give a sufficient time interval, pointer 29 is sprung outwardly and cap 23 is backed off of cylinder 10 a half turn until pointer 30 enters recess 25 and the time settings are all increased. Whereas if the setting F is too slow, cap 23 is screwed onto cylinder 10 until pointer 30 enters recess 25 but now the time intervals corresponding to the settings have been decreased. Furthermore, the cap 23 may be given one or more complete turns in either direction until the settings result in time intervals of the magnitude required.

Since many modifications of the photographic timing apparatus of the invention may be made without departing from the scope thereof, the present disclosure is to be construed in an illustrative and not in a limiting sense.

Having now particularly described my invention what I desire to secure by Letters Patent of the United States and what I claim is:

1. In a photographic timing apparatus, the combination with a cylinder provided with a port in the bottom thereof and adapted to receive a fluid, a piston within said cylinder and a spring tending to move said piston to the position of maximum displacement, of a control means for regulating the admission of fluid into said cylinder including a washer within said cylinder, a stop means within said cylinder for predetermining the position of said washer, and an adjustable cap for varying the position of the stop means within said cylinder with respect to the bottom thereof, said washer being movable into the predetermined position by the admission of fluid through said port into said cylinder.

2. In a photographic timing apparatus, the combination with a cylinder provided with a port in the bottom thereof and adapted to receive a fluid, a cap provided with a hole, threaded onto said cylinder and having a recessed portion and a plurality of graduations, a piston within said cylinder, a plunger attached to said piston and a spring tending to move said piston to the position of maximum displacement, of a washer within said cylinder and adjusted by rotation of said cap to assume a predetermined position within said cylinder with respect to the bottom thereof, said washer being movable into said predetermined position by the admission of fluid through said hole and said port into said cylinder, and a yoke detachably connected to said cylinder and having a pointer extending into the recessed portion of said cap in registration with a graduation thereon.

3. In a photographic timing apparatus, the combination with a cylinder provided with a port, a piston within said cylinder, a spring tending to move said piston to a position of maximum displacement, and a rod extending through said port and having a disk abutting one end of said spring, of a control means for regulating the admission of fluid into said cylinder including an adjustable cap for moving said disk to a predetermined position with respect to said port, and a washer within said cylinder and which is movable to a predetermined position adjacent said disk by the admission of fluid into said cylinder through said port.

4. A photographic timing apparatus comprising a cylinder provided with a port in the bottom thereof and adapted to receive a fluid, a cap adjustably attached to said cylinder and provided with a hole, a piston within said cylinder, a rod within said cylinder having a restricted portion extending through the port of said cylinder and abutting said cap, a spring normally moving said piston to a position of maximum displacement and resiliently maintaining the restricted portion of said rod against said cap, and a washer within said cylinder, adapted to be located by said rod in a predetermined position within said cylinder and adapted to be moved into said predetermined position by the admission of fluid through said hole and said port into said cylinder.

5. A pneumatic self-timer comprising a cylinder provided with a port in the bottom thereof and adapted to receive air, a cap provided with a hole and adjustably attached to said cylinder, a piston within said cylinder, a hollow plunger attached to said piston, a rod within said cylinder adapted to extend into said plunger and having a restricted portion extending through the port of said cylinder and abutting said cap, a spring encircling said rod, partly within said plunger, normally moving said piston to the position of maximum displacement and resiliently maintaining one end of the rod against said cap, and a washer within said cylinder, encircling the restricted portion of said rod, adapted to be located by said rod in a predetermined position within said cylinder with respect to the bottom thereof and adapted to be moved into said predetermined position by the admission of air through said hole and said port into said cylinder.

6. In a photographic timing apparatus, the combination with a cylinder provided with a port and adapted to receive a fluid, and a cap threaded onto said cylinder, provided with a recessed portion and having a plurality of graduations, and a washer adjusted, by rotation of said cap, with respect to said port for regulating the rate of admission of fluid into said cylinder through said port, of a pointer mounted on said cylinder, extending into the recessed portion of said cap to register with the graduations thereon and forming a stop to permit rotation but prevent unthreading of said cap from the cylinder.

7. In a photographic timing apparatus, the combination with a cylinder provided with a port and adapted to receive a fluid, a cap threaded onto said cylinder and provided with a recessed portion, a washer mounted for movement with respect to said port for varying the rate of admission of fluid into said cylinder through said port, and a stop means movable by said cap with respect to said port and for blocking said washer in a predetermined position with respect to said port, of a pair of pointers mounted on said cylinder, one of which extends into the recessed portion of said cap and the other of which makes frictional engagement with the outer surface of said cap.

8. In a photographic timing apparatus, the combination with a cylinder provided with a port and adapted to receive a fluid, a cap threaded onto said cylinder and provided with a recessed portion, a washer mounted for movement with respect to said port for regulating the rate of admission of fluid into said cylinder through said port, and a stop means movable by said cap with respect to said port and for blocking said washer in a predetermined position with respect to said port, of a yoke mounted on said cylinder and having a pointer extending into the recessed portion of said cap, and adjustable connections between said yoke and said cylinder for circumferential adjustment of said yoke with respect to said cylinder.

9. In a photographic timing apparatus, the combination with a cylinder provided with a port and adapted to receive a fluid, a cap threaded onto said cylinder and provided with a recessed portion, a washer mounted for movement with respect to said port for regulating the rate of admission of fluid into said cylinder through said port, and a stop means movable by said cap with respect to said port and for blocking said washer in a predetermined position with respect to said port, of a yoke mounted on said cylinder and having a pointer on each extremity of said yoke, one pointer extending into the recessed portion of said cap and the other pointer making frictional engagement with said cap, and adjustable connections between said yoke and said cylinder for circumferential adjustment of said yoke with respect to said cylinder.

WILLIAM A. RIDDELL.